(12) United States Patent
Kunkel (10) Patent No.: US 10,017,111 B2
(45) Date of Patent: Jul. 10, 2018

(54) DRIVER ASSISTANCE SYSTEM AND METHOD FOR AVOIDING COLLISIONS

(71) Applicant: ELEKTROBIT AUTOMOTIVE GmbH, Erlangen (DE)

(72) Inventor: Martin Kunkel, Erlangen (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 0 days.

(21) Appl. No.: 15/152,178

(22) Filed: May 11, 2016

(65) Prior Publication Data

US 2016/0332570 A1 Nov. 17, 2016

(30) Foreign Application Priority Data

May 12, 2015 (DE) .................. 10 2015 006 138

(51) Int. Cl.
*B60Q 9/00* (2006.01)
*G08G 1/16* (2006.01)

(52) U.S. Cl.
CPC ............ *B60Q 9/008* (2013.01); *G08G 1/161* (2013.01); *G08G 1/166* (2013.01)

(58) Field of Classification Search
CPC ........ B60Q 9/008; G08G 1/161; G08G 1/164; G08G 1/16; G08G 1/166; G08G 1/165
See application file for complete search history.

(56) References Cited

U.S. PATENT DOCUMENTS

2007/0282532 A1 12/2007 Yamamoto et al.
2010/0010742 A1 1/2010 Mochizuki
(Continued)

FOREIGN PATENT DOCUMENTS

CN 103832434 A 6/2014
CN 104575068 A 4/2015
(Continued)

OTHER PUBLICATIONS

Office Action dated Jan. 16, 2018 issued in counterpart Japanese application No. 2016-095597, with English translation (6 pages).
(Continued)

*Primary Examiner* — Dale Moyer
(74) *Attorney, Agent, or Firm* — Westerman, Hattori, Daniels & Adrian, LLP (57) ABSTRACT

Disclosed is a method for avoiding collisions between vehicles, comprising receiving data that represent a first travel path of a vehicle, the first travel path being a most probable path of the first vehicle, receiving data that represent at least one second travel path of at least one further vehicle, the second travel path being a most probable path of one of the further vehicles, determining whether the first travel path collides with the second travel path and, upon determination of a travel path collision, initiating generation of a signal to warn a driver of at least one of the vehicles of a possible collision with another vehicle. Additionally disclosed is a similar method for avoiding collisions between vehicles, which is executed by a device in a first vehicle. In this method, additionally, a current position of the first vehicle can be detected, and the travel path of the first vehicle is determined on the basis of the detected current position. Additionally disclosed are corresponding server systems and apparatuses in a vehicle that execute the methods, as well as a computer program product, having portions of program code, that can be executed on a processor system.

25 Claims, 5 Drawing Sheets

(56) References Cited

U.S. PATENT DOCUMENTS

| | | | | |
|---|---|---|---|---|
| 2012/0086582 A1* | 4/2012 | Durekovic | ............ | G08G 1/161 340/903 |
| 2013/0099911 A1* | 4/2013 | Mudalige | ............... | G08G 1/163 340/438 |
| 2014/0200782 A1 | 7/2014 | Goudy et al. | | |
| 2015/0032362 A1* | 1/2015 | Goudy | ................... | G08G 1/166 701/301 |
| 2016/0071417 A1* | 3/2016 | Lewis | ................... | G08G 1/162 701/301 |

FOREIGN PATENT DOCUMENTS

| | | |
|---|---|---|
| DE | 102 00 002 A1 | 8/2002 |
| DE | 103 34 203 A1 | 3/2005 |
| DE | 10 2009 028 299 A1 | 2/2011 |
| DE | 10 2012 009 297 A1 | 12/2012 |
| DE | 10 2011 078 946 A1 | 1/2013 |
| DE | 10 2012 021 282 A1 | 4/2014 |
| JP | 2004-227412 A | 8/2004 |
| JP | 2007017294 A | 1/2007 |
| JP | 2008065480 A | 3/2008 |
| JP | 2013250867 A | 12/2013 |
| JP | 2014225114 A | 12/2014 |
| WO | 2007/023899 A1 | 3/2007 |
| WO | 2012/129437 A2 | 9/2012 |
| WO | 2013/008806 A1 | 1/2013 |
| WO | 2014/074319 A1 | 5/2014 |

OTHER PUBLICATIONS

Office Action dated Apr. 8, 2018, issued in counterpart Chinese application No. 201610312574.1, with English tanslation. (11 pages).

* cited by examiner

DRIVER ASSISTANCE SYSTEM AND METHOD FOR AVOIDING COLLISIONS

TECHNICAL FIELD

The present disclosure relates in general to a technique for avoiding collisions between vehicles. In particular, the disclosure relates to a technique for avoiding collisions on the basis of a most probable path of at least one of the vehicles involved.

BACKGROUND

In vehicles such as, for example, a car, a lorry or also a motorcycle, ever more systems for driver support are being integrated. These include navigation devices and driver assistance systems (so-called Advanced Driver Assistance Systems-ADAS). These system can also be retrofitted in older vehicles, or taken into the vehicle by the driver, as portable devices, where they might be connected to a vehicle electronics system.

A navigation system accesses stored data of an underlying traffic network. The stored data serve, on the one hand, to map on a display of the navigation system a traffic network that is as real as possible and, on the other hand, to calculate routes or travel paths through the traffic network. On the basis of such a stored traffic network, it is possible for navigation systems to calculate particular travel paths or routes between a start point and a destination point. In addition, speed restrictions can be presented to the driver on a display or overlaid in the windscreen, or lanes of the carriageway that should be taken by the driver in order to follow the route are displayed.

One aspect of driver assistance systems is that of driver support in controlling the vehicle. A driver assistance system can alert the driver to particular features on the course ahead of the vehicle. For example, when travelling through bends and/or upon approaching intersections, the front headlights may be adjusted in order to increase the traffic safety. In other words, the driver assistance system supports the driver through "anticipatory driving".

For these tasks, the driver assistance system requires a most probable travel path, i.e. a possible future travel path. This most probable travel path is also referred to as the "Most Probable Path (MPP). The calculation of such a future route (travel path) is effected by a horizon provider. The latter determines an expected horizon, also called an electronic horizon, along which the driver will most probably travel. The electronic horizon is determined on the basis of a traffic network that is provided, for example, by the navigation system or another map data provider.

In this case, starting from the current vehicle position within the traffic network, various travel paths in the traffic network are determined along from links (roads) and nodal points (e.g. intersections). For each possible path, probabilities are calculated, which give the probability with which the driver will select this path. These probabilities may be determined by attributes of the links or nodal points, or also on the basis of stored travel data of previous journeys. The current position is determined by known systems and methods, and thus the current MPP is calculated continuously. If a destination and a route leading to it are known by the horizon provider, for example by a connected navigation system, this route may represent the MPP, or at least greatly influence the calculation of the latter. The MPP also need not comprise the entire calculated route, but may represent only a particular stretch ahead on the route, starting from the current position.

Even if navigation systems and driver assistance systems already support the d river in controlling the vehicle, there is still a need to improve these systems.

BRIEF SUMMARY

An improved technique for supporting the driver of a vehicle is to be provided.

To achieve this object, according to a first aspect of the present disclosure, a method for avoiding collisions between vehicles is provided. This method comprises receiving data that represent a first travel path of a vehicle, the first travel path being a most probable path of the first vehicle, and receiving data that represent at least one second travel path of at least one further vehicle, the second travel path being a most probable path of one of the further vehicles. In addition, the method comprises determining whether the first travel path collides with the second travel path. The first and the second travel path are a most probable path of the respective vehicle. These travel paths may be future travel paths, on which the respective vehicle will move with the greatest probability. In addition, the method also comprises, upon determination of a travel path collision, initiating generation of a signal to warn a driver of at least one of the vehicles of a possible collision with the other vehicle.

If it is ascertained that the first and the second travel path collide, a driver of at least one of the vehicles involved may be warned by a corresponding generation of a signal. This warning may draw to the attention of the driver, in a quite general manner, that there is an impending hazard, by the output of a warning tone or the display of a warning signal such as, for example, an exclamation mark. However, the warning may also be more specific, and explicitly alert the driver to a hazard situation with another vehicle. In this case, the warning may contain additional information, for example "Attention. Possible collision in x seconds" or "Attention. Vehicle from right at next intersection".

The receiving of data may be receiving data that identify one or more nodal points of a traffic network and/or one or more links between nodal points of the traffic network and/or one or more shape points of the respective travel path. These data may identify the respectively most probable path (MPP) in a traffic network. For example, the data may contain identifying information (IDs) about the network nodal points of the traffic network. Alternatively or additionally, the data may also contain one or more so-called "shape points" along the respective MPP, by means of corresponding identification (IDs). Such shape points may be specified, in particular, at the start or end of the MPP, since the MPP does not necessarily begin and/or end at a nodal point of the traffic network. Clearly, the data may alternatively, or also additionally, contain the nodal point(s) and shape point(s) as coordinates in the traffic network or as global coordinates; the coordinates of the WGS84 format or Mercator format may be cited here as examples.

Furthermore, the received data may also contain information relating to an underlying map material. For example, the map material may be identified by a unique identification (ID), and/or the data may contain a name and a version number of the map material. It can thereby be checked whether the received data can be used directly or must first be transferred to another map material. If the nodal point(s) and shape points(s) contained in the data are received as global coordinates, they can be used even without information relating to the underlying map material.

Alternatively or additionally, the receiving of data may comprise receiving data that represent a current position of at least one of the vehicles belonging to the travel paths. The current position may be specified in the form of coordinates. Alternatively or additionally, the current position may also be contained in the data by means of specification of a nodal point in the traffic network or of a shape point along a link. Likewise alternatively or additionally, the current position may also be contained in the data by means of a distance in relation to a nodal point in the traffic network or in relation to a shape point.

Likewise alternatively or additionally, the determining of a travel path collision may comprise determining a point of potential collision within a traffic network. For example, along the first travel path, it can be ascertained, by evaluating attributes relating to the links and nodal points of the traffic network, at which point the first travel path (MPP) affects another link of the traffic network. In this case, there may be determination of nodal points at which other links of the traffic network, in the direction of travel of the MPP, come into or end in the latter, such as, for example, approach lanes. Likewise, the change from a one-way road to a dual-direction road can be determined. Overtaking lanes or other points of potential collision may also be determined, from corresponding attributes of link, by evaluation of the lanes of the links.

Accordingly, the determining of a point of potential collision may comprise checking whether the first and the second travel path have a common element in the traffic network. As already outlined above, the common element in the traffic network may represent a nodal point or also a link within the traffic network. The evaluation of shape points of the links may also indicate a point of potential collision. For example, bends may be identified, on a link in the traffic network (winding road), in which an overtaking manoeuvre could lead to a hazard situation. Likewise, the start and the end of a no-overtaking region may be points of potential collision.

The method may also comprise calculating a first arrival instant, at which the vehicle belonging to the first travel path arrives at the point of potential collision, in dependence on the first travel path. Likewise, the method may comprise calculating a second arrival instant, at which the vehicle belonging to the second travel path arrives at the point of potential collision, in dependence on the second travel path. The method may then also include calculating a difference between the first and the second arrival instant, the determining of a travel path collision and/or initiating the generation of a signal being effected in dependence on the calculated time difference.

If a point of potential collision is indeed ascertained on one or both MPPs, a warning should only be output to the driver if the vehicles arrive at the point of potential collision within a particular time difference (a particular time window). Thus, for example, on an approach lane, it is possible to dispense with a warning if there is a time period of more than 1 or 2 seconds between the two arrival instants of the vehicles involved. In the case of an intersection, a time difference of 3 or even 5 seconds may be selected for initiating the generation of a signal or determining a possible travel path collision. In the case of an overtaking manoeuvre, the selected time difference to be considered may be even greater (e.g. 8 seconds), since an adequate safety distance between the vehicles involved is to be maintained.

The time periods specified here are mentioned only as examples. Clearly, shorten or longer time differences are also possible.

In addition, the initiating of generation of a signal may comprise sending, to the at least one of the vehicles, data that identify a possible collision with another vehicle. The sending of the data may thus not only identify the warning of a possible collision in the near future, but may also contain specific information. For example, data containing the possible collision point (intersection, approach lane, deceleration strips, overtaking lane, etc.) may be sent to the at least one of the vehicles by specification of a corresponding identification (ID) within the traffic network. On the other hand, an indication of a possible collision time may also be sent in the data. Thus, even without specification of a collision point, the vehicle receiving the data can warn the driver, in a quite general manner, of a hazard situation at the given instant.

According to a further aspect of the present disclosure, a server system is provided, which comprises a data transmission unit and a processor system. The data transmission unit is designed to receive data from at least one vehicle and to send data to at least one vehicle. The processor system is designed to control the data transmission unit and to execute the method according to the first aspect described above and/or one of the described modifications thereof.

According to such a server system, it is therefore possible for the vehicles each to transmit only their most probable path (MPP) to a server system. If a most probable path (MPP) has already been transmitted to the server system, the vehicles may also transmit only portions of the MPP that have changed since the last transmission. The processor system of the server system then determines whether a travel path collision exists between two or more of these vehicles. In the case of such a determined travel path collision, a signal is transmitted to the vehicles involved, enabling the respective vehicle to warn the driver. The computing capacity for determining travel path collisions can thus be rendered by a server system, while the devices in the vehicles need be designed only to determine an MPP, to transmit the MPP to the server system, and to receive and output a warning signal. Devices that have a lesser computing capacity can consequently be used in the vehicles, enabling them to be produced less expensively. The required bandwidth of the data transmission can also be reduced in comparison with a complete data exchange between all vehicles.

In contrast, also provided, according to a further aspect, is a method for avoiding collisions between vehicles, the method being executed by a device in a first vehicle. The method in this case comprises detecting a current position of the first vehicle and determining a travel path of the first vehicle on the basis of the detected current position, the travel path being a most probable path of the first vehicle. The method additionally comprises receiving data that represent a travel path of a second vehicle, the travel path being a most probable path of the second vehicle, and determining whether the travel path of the first vehicle collides with the travel path of the second vehicle. The method may also comprise, upon determination of such a travel path collision, initiating generation of a signal to warn a driver of the first vehicle of a possible collision with the second vehicle.

According to the method of this aspect, also, the receiving of data may comprise receiving data that identify one or more nodal points of a traffic network and/or one or more links between nodal points of the traffic network and/or one or more shape points of the travel path of the second vehicle. Alternatively or additionally, the determining of the most probable path (MPP) may additionally be effected on the basis of map data, the map data representing traffic routes of at least one traffic network region in which the current position of the first vehicle is located. The map data may be provided, for example, by a navigation system or a navigation software. A particular portion of the map data (a so-called map element, or "tile") may be determined on the basis of the determined current position of the first vehicle. The data stored in this map element comprise nodal points, links and link attributes of the underlying traffic network within the portion that is represented by the map element. The MPP can then be determined for the first vehicle on the basis of these data. Clearly, more than one map element may be used to determine the MPP, starting from the current position of the first vehicle. For example, depending on a distance of the current position in relation to an edge of the map element, a map element adjoining the latter may likewise be used for determining the MPP.

Alternatively or additionally, the determining of a travel path collision may comprise determining a point of potential collision within a traffic network along the travel path of the first vehicle. As already explained above, the point of potential collision may be an intersection, overtaking lane, approach lane, deceleration strips, end of a one-way road, etc. In this case, the determining of a point of potential collision may comprise checking whether the travel paths of the first and the second vehicle have a common element in the traffic network. Here, an element in the traffic network means primarily a nodal point or a link in the traffic network. Alternatively or additionally, however, the determining of a travel path collision may first be effected more generally, wherein it is checked whether the MPPs of the vehicles involved comprise a common map element.

Likewise alternatively or additionally, the receiving of data may comprise receiving data that identify a point of potential collision within a traffic network along the travel path of the second vehicle. In other words, data relating to the MPP of the second vehicle may be received, in which a point of potential collision is already identified.

The method may additionally comprise calculating a first and a second arrival instant, and calculating a time difference between the first and the second arrival instant. The first arrival instant in this case is when the first vehicle arrives at the point of potential collision, and is calculated in dependence on the associated travel path. Likewise, the second arrival instant indicates when the second vehicle arrives at the point of potential collision, this arrival instant also being calculated in dependence on the associated travel path. In this case, the determining of a travel path collision and/or the initiating of generation of a signal may be effected in dependence on the calculated time difference.

Further, the method may comprise receiving data that represent a time specification, when the second vehicle occupied a particular position. In this case, the calculating of a second arrival point may be effected in dependence on this time specification of the second vehicle. Alternatively or additionally, the method may comprise receiving data that represent a hazard instant, at which the second vehicle is present at the point of potential collision (will actually be present in the future). In this case, the calculating of a second arrival instant may be effected in dependence of the hazard instant. In both cases, the first vehicle receives data by means of which it can calculate a future movement of the second vehicle (by means of a time specification relating to a particular position of the second vehicle). Upon receiving the future hazard instant, the first vehicle can determine whether it will arrive at the respective point of potential collision at a similar instant. Here, a similar instant means that the first vehicle arrives at the point of potential collision with a particular time difference in relation to the hazard instant. This arrival may occur either earlier or later than that of the second vehicle.

Further, the calculating of the first arrival instant may be effected in dependence on the current position of the first vehicle, and/or the calculating of a second arrival instant may be effected in dependence on a start point of the travel path of the second vehicle. Alternatively or additionally, the method may comprise receiving data that identify a position of the second vehicle. In this case, the calculating of a second arrival instant is effected in dependence on the position of the second vehicle.

The received data may also be received from a central server system, i.e. originate from the central server system. For this purpose, the first vehicle may be connected to the central server system via a data connection. Alternatively, the data may also be received directly from the second vehicle (by means of a so-called point-to-point connection).

Furthermore, the method may also comprise sending data. The sent data in this case may represent the current position of the first vehicle, the most probable path (MPP) of the first vehicle, map data of a map region in which the current position of the first vehicle is located, a point of potential collision within a traffic network, and/or a hazard instant, at which the first vehicle is present at the point of potential collision. The data in this case may be sent to a central server system. Alternatively or additionally, the data may be transmitted to another vehicle in direct data communication.

In the case of the receiving and sending of data from and to a server system, pre-filtering of the data may be effected by the server system. For example, only MPPs of other vehicles may be forwarded to the first vehicle by the server system if these vehicles are located on the same or adjacent map element of the current position of the first vehicle. On the other hand, if the current position of the vehicle is not known to the server system, it may forward the MPPs of all other vehicles to the first vehicle.

Provided according to a further aspect of the present disclosure is an apparatus for avoiding collisions between vehicles, which is disposed in a first vehicle. The apparatus comprises a position detection unit, which is designed to detect a current position of the first vehicle. It additionally comprises a path determination unit, which is designed to determine a travel path of the first vehicle on the basis of the detected current position, the travel path being the most probable path (MPP) of the first vehicle. Finally, the apparatus also comprises a data transmission unit, which is designed to receive data that represent a travel path of a second vehicle. Finally, the apparatus comprises a data processing unit, which is designed to determine whether the travel path of the first vehicle collides with the travel path of the second vehicle, and, upon determination of a travel path collision, to initiate generation of a signal to warn a driver of the first vehicle of a possible collision with the second vehicle.

Further, the path determination unit may be designed to determine the travel path of the first vehicle additionally on the basis of map data, the map data representing traffic ways of at least one traffic network region. In this case, the at least one traffic network region may be a traffic network region in which the current position of the vehicle is located.

The data processing unit may further be designed to determine a point of potential collision within a traffic network along the travel path of the first vehicle. Alternatively or additionally, the data transmission unit may be designed to receive data that indicate a point of potential collision within a traffic network along the travel path of the second vehicle.

Likewise alternatively or additionally, the data processing unit may furthermore be designed to calculate a first arrival instant, at which the first vehicle arrives at the point of potential collision, in dependence on the associated travel path, and to calculate a second arrival instant, at which the second vehicle arrives at the point of potential collision, in dependence on the associated travel path. The data processing unit in this case may be designed to calculate a time difference between the first and the second arrival instant, and to determine a travel path collision and/or to initiate generation of a signal in dependence on the calculated time difference.

In addition, the data transmission unit may be designed to receive data that represent a time specification, when the second vehicle occupied a particular position, and/or data that represent a hazard instant, at which the second vehicle is present at the point of potential collision. In this case, the data processing unit may further be designed to calculate the second arrival instant in dependence on the time specification of the second vehicle and/or in dependence on the hazard instant. Alternatively or additionally, the data processing unit may be designed to calculate the first arrival instant in dependence on the current position of the first vehicle, and/or to calculate the second arrival instant in dependence on a start point of the travel path of the second vehicle.

Further, the data transmission unit may be designed to receive data that indicate a position of the second vehicle. The data transmission unit in this case may be designed to calculate the second arrival instant in dependence on the position of the second vehicle.

Alternatively or additionally, the data transmission unit may also be designed to receive and send from and to a central server system and/or a data transmission unit of another vehicle.

The data processing unit may also be designed to execute one or more functions of the path determination unit and/or of the position detection unit.

Furthermore, the apparatus described above may be part of a vehicle navigation system and/or part of a driver assistance system. Alternatively or additionally, the apparatus may be a portable device.

Provided according to a further aspect is a computer program product, which comprises portions of program code that, when executed by a processor system, cause the processor system to execute one of the methods described above.

BRIEF DESCRIPTION OF THE DRAWINGS

Further details, aspects and advantages are given by the drawings that follow. There are shown in.

DETAILED DESCRIPTION

The present disclosure is explained with the aid of schematic block diagrams. The technical teaching underlying these diagrams may be implemented both in hardware and in software, or in a combination of hardware and software. Such implementations also include digital signal processors (DSP), application-specific integrated circuits (ASIC) and other switching or computing components.

Figure 5:
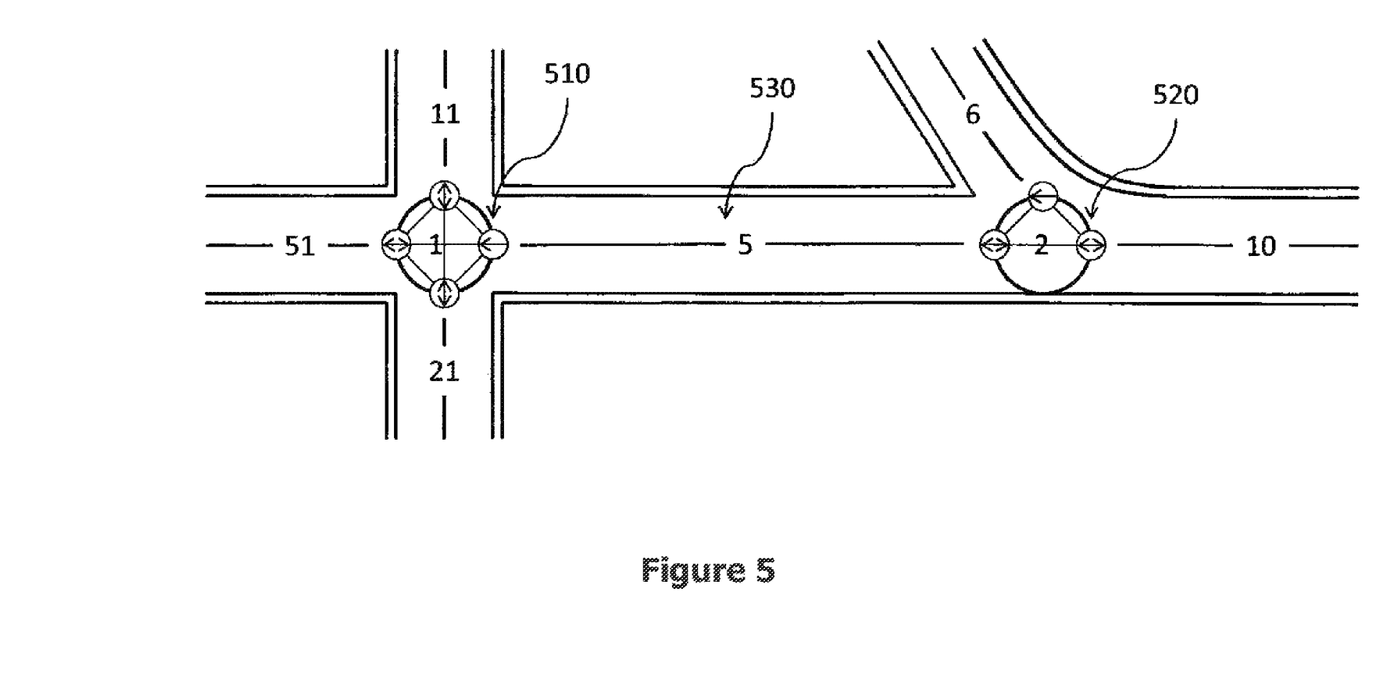
FIG. 5 an example of a road in a traffic network, with specification of nodal points and links.

Firstly, elements of a traffic network are explained on the basis of FIG. 5. FIG. 5 shows, exemplarily, a graphical representation of a portion of a traffic network or road network, such as is stored in memory for navigation systems or driver assistance systems. A traffic network in this case is represented by nodal points such as, for example, intersections or branch-offs, and intermediate links. In the portion of the traffic network shown in FIG. 5, an intersection and a branch-off are illustrated. In the underlying data, a unique identifier (ID), by which the corresponding nodal point can be referenced or located, is stored in relation to the intersection or branch-off. For example, in FIG. 5, the intersection (on the left in the figure) is identifiable by the identifier "1", while the branch-off (on the right in the figure) is identifiable by the identifier "2".

The rest of the traffic network is provided by links between or at these nodal points in the underlying data. Each of these links is likewise identifiable by a unique identification. The identifiers "51", "11", "21", "5", "6", and "10" identify the links shown in FIG. 5. For each link, its start nodal point and end nodal point are also stored in the underlying data. In the case of the link "5", for example, these are the nodal points "1" and "2". A complete network of all routes is thus provided.

To enable calculation of a route through this traffic network, further attributes of the links and of the nodal points are stored in the data. In the case of the branch-off "2" shown in FIG. 5 (on the right in the figure), it can be seen that the branch-off can be approached only from one direction, coming from the link "10". In other words, it is only possible to turn off into the link "6" by coming from the link "10". Likewise, it can be deduced from the attribute of the nodal point "1" that the link "5" is a one-way road, which ends at the intersection "1".

In addition, yet further attributes may be stored in the data relating to the traffic network, such as, for example, a road classification of a link, number of lanes, tunnel, roundabout, approach lane, deceleration strips, speed restriction, etc. Shape points may also be stored in relation to a link between two nodal points. These shape points indicate points, on the link between the two nodal points belonging to the link, at which a property of the link or an attribute changes. For example, a speed restriction, an overtaking prohibition, a stopping prohibition, etc. may begin or end. The geometry of the link may also change at a shape point. For example, the curvature of the underlying road (course of bend) changes at a shape point. Specification of coordinates such as, for example, global coordinates or relative coordinates in respect of a nodal point, enables the course of the road to be stored in a simple form.

The methods and apparatuses of the present disclosure can operate on the basis of these stored data. For example, a horizon provider or a driver assistance system may use these data, as explained in the following.

Figure 1:
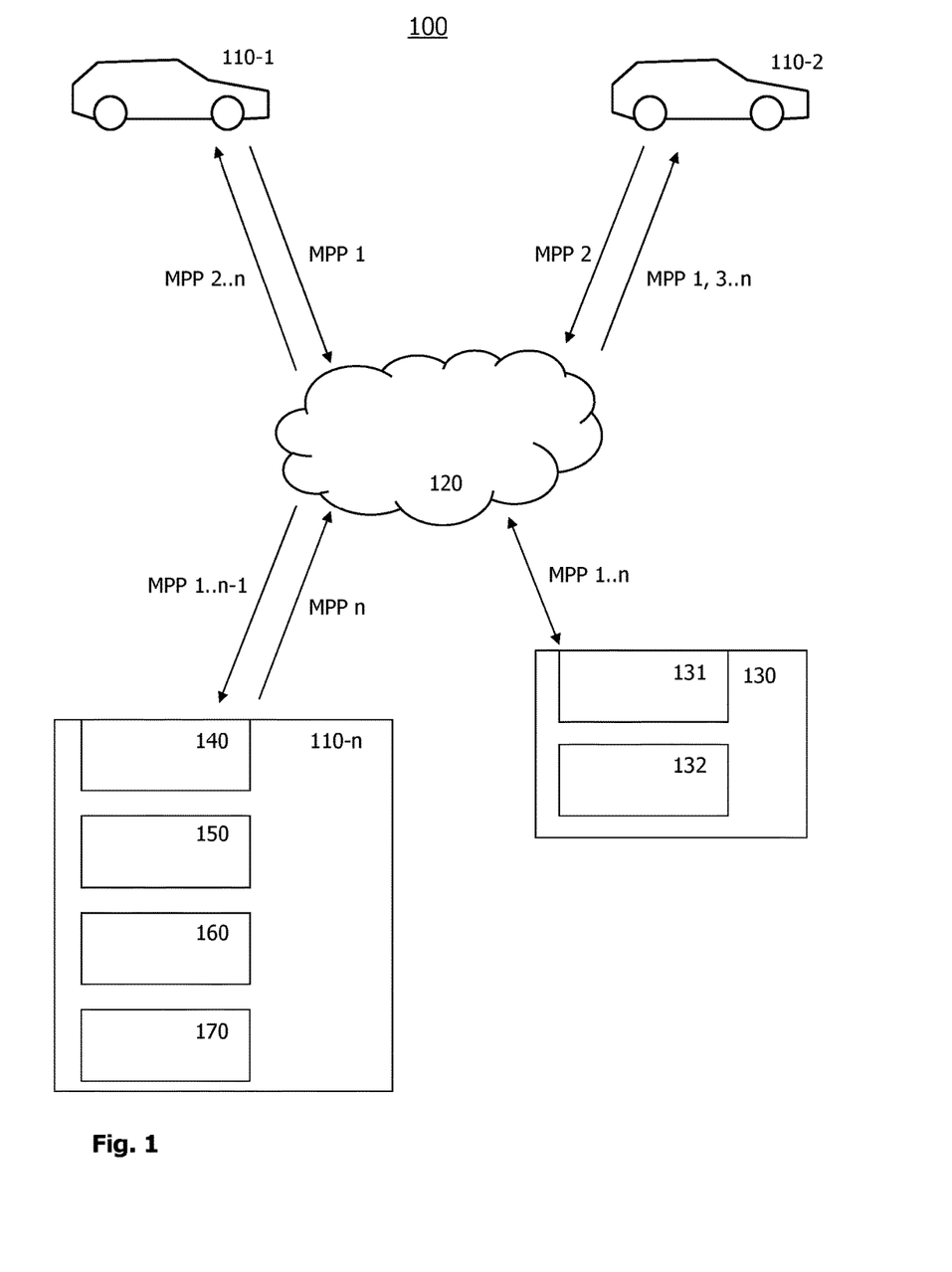
FIG. 1 a system composed of apparatuses according to embodiments of the present disclosure.

FIG. 1 shows a system 100 composed of apparatuses according to embodiments of the present disclosure. Represented schematically therein are apparatuses 110 for avoiding collisions between vehicles. These apparatuses 110 may be disposed in a vehicle. FIG. 1 shows two of these apparatuses 110 in a quite general manner, as vehicles 110-1 and 110-2, while a further one of these apparatuses 110-N is represented in greater detail. Clearly, the apparatus 110-N may also be integrated in a vehicle, or be disposed therein as a portable device. For example, the apparatus 110-N is part of a navigation system of a motor vehicle. Alternatively or additionally, the apparatus 110-N may be a part of a driver assistance system. In the case of a portable apparatus or device 110-N, an interface (not shown) may be provided, in order to connect the apparatus 110-N to further vehicle components such as, for example, a display device, a loudspeaker device or a position detection unit integrated in the vehicle.

The apparatus 110 comprises a position detection unit 150, which is designed to detect a current position of the vehicle. The position detection unit 150 may be a satellite-supported position detection unit such as, for example, a GPS system. Alternatively or additionally, the position detection unit 150 may also comprise one or more inertial sensors such as, for example, a velocity meter, acceleration sensor, steering-lock sensor, gyroscope, etc. The operation of the position detection unit 150 in this case may also be map-based, a position within a traffic network of a map being detected and tracked on the basis of changes in steering and speed and/or on the basis of a cardinal point determination and/or on the basis of map information.

The apparatus 110 additionally comprises a horizon provider or path determination unit 160, which is designed to determine a travel path of a vehicle, in which the apparatus 110 is disposed, on the basis of the detected current position. The travel path in this case is a most probable travel path of the vehicle. The most probable travel path, also called the "most probable path" (MPP), is a future path of the vehicle that is taken with the greatest probability. This MPP is determined on the basis of nodal points of a traffic network and/or links between such nodal points of the traffic network and the associated attributes thereof, as was explained at the outset with reference to FIG. 5. Starting from a particular position within the traffic network, for example the detected current position of the vehicle, various travel paths in the traffic network are determined, along the links and nodal points. For this purpose, probabilities are calculated for each possible path, these indicating the probability with which the driver will select this path. These probabilities may be determined by the attributes of the links and nodal points (such as, for example, road class, number of lanes, speed restrictions, etc.), or also on the basis of stored travel data from previous journeys. For example, the system may consider a route frequently selected by the driver as being more probable than a path on a route that has never been travelled hitherto. The path having the greatest probability is defined as the most probable path (MPP).

The defined MPP may be stored on the basis of its nodal points and/or the intermediate links. For this purpose, it is sufficient to store, for example, the identifications (IDs) of the nodal points and/or links. Moreover, the calculated MPP may be transmitted to other vehicle components for further use, such as, for example, to a driver assistance system. The transmission is effected by means of a socket connection or bus connection in the vehicle (e.g. CAN, LIN, Ethernet, etc.).

The apparatus 110 additionally comprises a data transmission unit 140, which is designed to receive data that represent a travel path of a second vehicle. This travel path is likewise a most probable path, in this case of the second vehicle. This reception of data by each of the apparatuses 110 is indicated in FIG. 1. Thus, the apparatus 110-1 receives at least one travel path (MPP2 . . . n) of a second vehicle or also of a plurality of further vehicles. The apparatus 110-2 receives the MPP1 of the first vehicle 110-1 and the travel paths MPP3 . . . n of the other vehicles. The apparatus 110-N also receives at least one most probable path (MPP1 . . . n−1) of at least one further vehicle such as, for example, the vehicles 110-1 and 110-2.

A network 120, via which the reception of data is accomplished for the data transmission unit 140, is represented schematically in FIG. 1. The network 120 may be a data network such as, for example, the Internet. Alternatively, it may also be a data network of a mobile telephone network. Since the apparatuses 110 are mobile apparatuses, the data reception of the at least one MPP is effected wirelessly. For example, the data transmission unit 140 establishes a mobile telephony connection, and in particular a mobile telephony data connection, for this purpose.

The sending and receiving of an MPP may be limited to the transmission of nodal points and/or links in the traffic network that are located on or along the MPP. It is again sufficient in this case to send or receive only identifications (IDs) of the corresponding elements of the traffic network. A very small amount of data can thus be transmitted, which reduces the utilization of the storage, processor and data transmission resources to a minimum. Clearly, more data may also be transmitted, depending on the design of the apparatuses 110 and/or the network 120 involved. For example, information relating to shape points, relative position information on a link, vehicle-related GPS coordinates, or also time stamps relating to particular items of these data, may also be transmitted. The transmission of the data is effected on the basis of a format and protocol appropriate for the data, the network 120 and the apparatuses 110. As examples only, JSON (JavaScript Object Notation), Franca IDL (Franca Interface Definition Language), XML (eXtensible Markup Language), UML (Unified Modeling Language) are cited here as data formats. Clearly, special specific-purpose binary formats may be used, in order to require the least possible bandwidth. Possible transmission standards are, for example, TCP/IP and/or UDP.

Finally, the apparatus 110 also comprises a data processing unit 170, which is designed to determine whether the travel path of the first vehicle (e.g. 110-1) collides with the travel path of the second vehicle (e.g. 110-2). Further, upon determination of a travel path collision, the data processing unit may initiate generation of a signal to warn a driver of the first vehicle of a possible collision with the second vehicle. The generated signal may be a warning signal that is sent to an output unit (not shown), in order there to output the warning to the driver. For example, this may be a screen, on which a graphical representation of a warning (exclamation mark and/or text and/or other warning sign) is displayed. Alternatively or additionally, an acoustic warning message may be output via a loudspeaker of the vehicle. This may be a particular tone, a particular tone sequence or a speech output.

FIG. 1 additionally shows a server system 130, which comprises a data transmission unit 131 and a processor system 132. The data transmission unit 131 is designed to receive data from at one vehicle and to send data to at least one vehicle. A data exchange in both directions via the network 120, by means of the apparatuses 110 (i.e. the vehicles), is represented schematically in FIG. 1.

The processor system 132 is designed to control the data transmission unit 131. For this purpose, it can further process the received data and prepare data for data transmission to the apparatuses 110. It can be seen from FIG. 1 that each apparatus or vehicle 110 transmits the respective associated travel path MPP1 to MPP*n* and receives the other travel paths MPP1 . . . *n*, except for its own travel path. In the case of the server system 130, all travel paths MPP1 . . . *n* are received. If each apparatus 110 communicates exclusively with the server system 130, the apparatuses or vehicles 110 transmit their own travel paths to the server system 130, which forwards the respectively received travel paths to all other apparatuses or vehicles 110. This may also be effected in a filtered manner, such that only travel paths of other vehicles that are relevant for an apparatus 110 are forwarded. The relevance may be determined on the basis of a spatial proximity.

The processor system 132 is further designed to process particular process steps in order to execute a method according to an embodiment of the present disclosure. These process steps may be the same, or largely the same, steps as those executed by the data processing unit 170 of one of the apparatuses 110. A computer program product, which comprises at least portions of program code, may be stored for this purpose on the server system 130, or on the apparatuses 110. The portions of program code may be executed by the processor system 132 in order to cause the processor system 132 to execute a method.

Figure 2A:
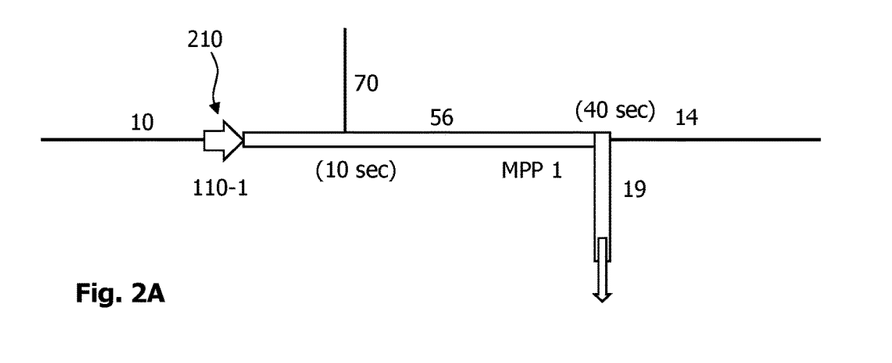
FIG. 2A a schematic representation of a traffic network and most probable paths of two vehicle.
Figure 2B:
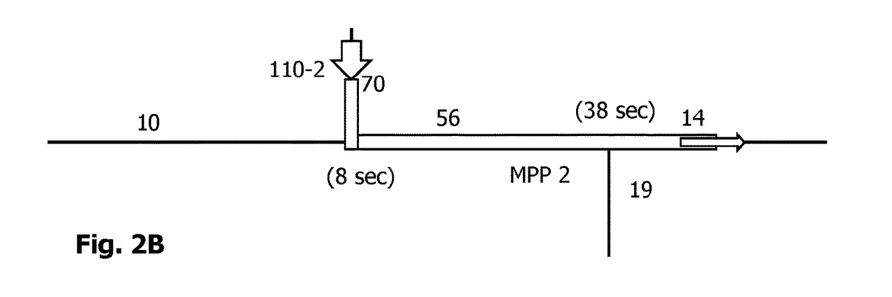
FIG. 2B a schematic representation of the traffic network of FIG. 2A and most probable path of a second vehicle.
Figure 2C:
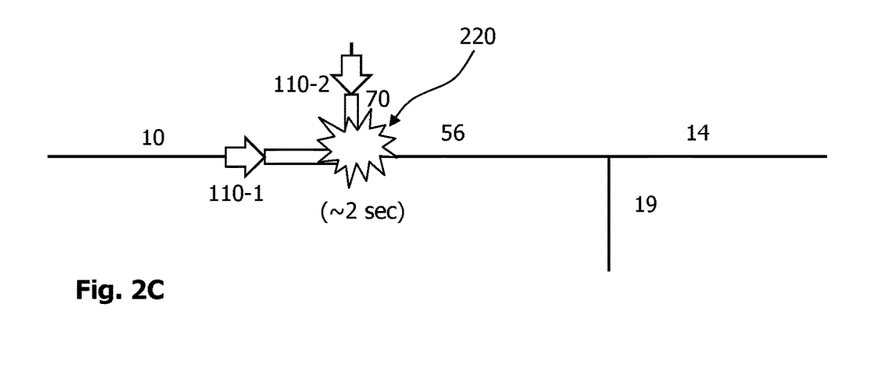
FIG. 2C a schematic representation of the traffic network of FIGS. 2A and 2B and the determination of a travel-path collision of the first vehicle of FIG. 2A and the second vehicle of FIG. 2B.

Such a method is now described on the basis of FIGS. 2A to 2C and FIG. 3. Represented in FIGS. 2A to 2C is a portion of a traffic network, which exists in the form of nodal points, links and attributes, as has already been explained in greater detail above on the basis of FIG. 5. In the portion of the traffic network according to FIGS. 2A to 2C, only the unique identifications of the links are indicated, to simplify the representation. These links are indicated by the identifications (IDs) "10", "70", "56", "14", and "19". Clearly, the nodal points between the links are also provided with a corresponding unique identification, but these are not indicated for reasons of clarity in the figures. The underlying data may also include attributes relating to the links and nodal points, which are used for evaluating or determining travel paths and MPPs.

Figure 3:
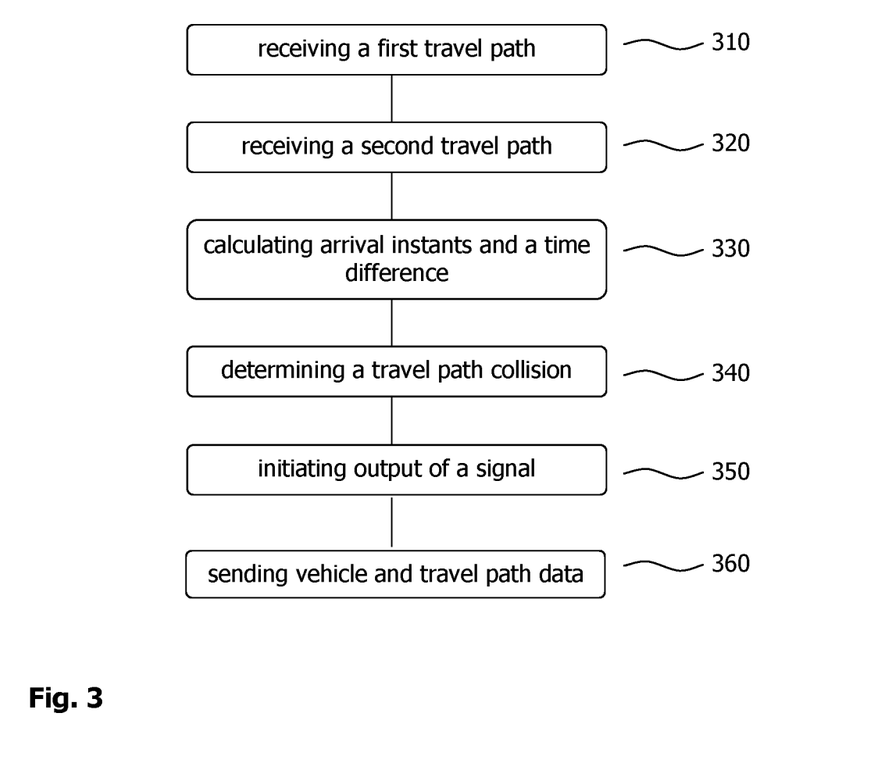
FIG. 3 a sequence diagram of a method according to an embodiment of the present disclosure.

Represented in FIG. 3 is a sequence diagram of a method according to an embodiment of the present disclosure. The method may be executed, for example, by the processor system 132 of the server system 130 (both FIG. 1), but also by the data processing unit 170 of the apparatus 110-N (likewise FIG. 1). This method commences with the receiving (step 310) of a first travel path. In this case, data representing the first travel path of a vehicle are received. The first travel path is a most probable path of the first vehicle 110-1. In FIG. 2A, such a travel path is indicated by an enlarged representation on the associated links. The travel path MPP1 begins at the current position 210, and in this example consists of a portion of the link "10" and the complete links "56" and "19". The received data may also contain the nodal points between the links along the travel path. Likewise, so-called shape points may be included in the received data. These shape points may be points, along a link, at which particular properties of the link change, such as, for example, a curvature in the course of the road, a speed restriction or other characteristic properties of the link. In the case of the travel path MMP1 according to FIG. 2A, for example, the data representing the first travel path may contain a shape point of the link "10", in order to identify the start of the MPP. Advantageously, this shape point determining the start of the MPP is the shape point on the link "10" that is closest to the current position 210. In this, a direction of travel of the vehicle may be taken into account, in order that a shape point that has already been "crossed" is not determined as a start.

In a further step 320 of the method, data representing the at least one second travel path MPP2 of at least one further vehicle 110-2 are received. As represented in FIG. 2B, this second travel path MPP2 comprises a portion of the link "70", the complete link "55" and a portion of the link "14". Clearly, the data representing the second travel path MPP2 may also comprise a travel path longer than that represented. Thus, for example, the data for the second travel path may also include the complete link "14".

It is then determined whether the first travel path MPP1 collides with the second travel path MPP2 (step 340). In the most simple form, the determination of a travel path collision may consist in comparing the travel paths MPP1 and MPP2. As represented in FIG. 2C, a first possible collision point ensues at the nodal point between the links "10", "70" and "56". On the basis of the determination of this travel path collision, generation of a signal may be initiated, in a step 350, in order to warn a driver of at least one of the involved vehicles 110 of a possible collision with another vehicle 110. For this purpose, the processor system 132 may initiate sending of data, which identifies a possible collision with another vehicle 110, to the at least one of the vehicles 110. For this purpose, the corresponding data are transmitted, via the data transmission unit 131 and via the network 120, to the respective data transmission units 140 of the apparatus or vehicles 110 (step 360).

In the receiving of data representing a travel path (MPP) (steps 310 and 320), data that represent a current position of at least one of the vehicles 110 belonging to the travel paths (MPPs) may also optionally be received. These may be coordinate data within a global coordinate system. Alternatively, the data may also contain, as a current position, relative coordinates in respect of the traffic network. For example, relative coordinates on a link (such as, for example, a distance in relation to a nodal point belonging to a link), or also information relating to shape points on a link, may constitute these data.

An arrival time of the vehicle 110 at particular nodal points or other locations within the traffic network may be determined on the basis of the current position of the vehicle 110 and the attributes of the link known to the system 132. As represented in FIGS. 2A and 2B, an arrival time of 10 seconds at the first nodal point (between links "10" and "56") may be determined for the vehicle 110-1. The arrival time of the vehicle 110-1 at the next nodal point (between link "56" and "19") may be determined at 40 seconds. For the second vehicle 110-2, the obtained arrival times at the respective nodal points are 8 seconds and 38 seconds. The time specifications enable the processor system 132 to determine a travel path collision with greater precision.

The method may also comprise an optional step 330, which comprises determining a point of potential collision within a traffic network, before the determination of the travel path collision. The processor system 132 may evaluate, along the travel path MPP1 for the vehicle 110-1, the attributes belonging to the links and nodal points of the traffic network, in order to determine such a point of potential collision within the traffic network. A point of potential collision may be an intersection, i.e. a nodal point within the traffic network, but also other hazard points within the traffic network. These include, for example, approach lanes, deceleration strips, overtaking lanes provided for at least one direction of travel, the start of a bend, i.e. a shape point on a link, the end of a one-way road and merging with contraflow traffic.

The processor system 132 may now determine whether the travel paths MPP1 and MPP2 meet, at least at these points of potential collision. Even without consideration of a time aspect, therefore, each of these points of potential collision may be displayed to the driver of the respective vehicle by generation of a corresponding signal, or indicated acoustically. At each of these points, a warning is thus output to the driver, not only of a point of potential collision, but of a possible collision, because of the travel path (MPP) of a further vehicle 110.

In the determination of a point of potential collision, in step 330, it may also be checked whether the first and the second travel path (MPP1, MPP2) have a common element in the traffic network. For example, opposite directions of travel of a road (link) that has separate carriageways (central strip, etc.) do not have a common element. This check allows a more detailed determination of the point of potential collision. It may also be determined whether there are points of potential collision of a travel path MPP1 of a first vehicle 110-1 in/on a second travel path MPP2 of a second vehicle 110-2, and how many such points exist. The vehicle 110-2 may possibly turn off, such that the travel paths do not meet at any point of potential collision of the first travel path MPP1.

In addition, a first arrival instant may be also be calculated in step 330. This first arrival instant indicates when the vehicle 110-1 belonging to the first travel path MPP1 arrives at the point of potential collision. Again with reference to FIG. 2A, this may be, for example, the nodal points and the arrival times of 10 seconds and 40 seconds, already specified above. These arrival instants are determined by the processor system 132 in dependence on the first travel path MPP1. Likewise, the processor system 132 may calculate a second arrival instant. The latter indicates when the vehicle 110-2 belonging to the second travel path MPP2 arrives at the point of potential collision. The calculation of the second arrival instant is likewise effected in dependence of the, in this case second, travel path MPP2. As represented in FIG. 2B, the arrival times are those of 8 seconds and 38 seconds at the corresponding points of potential collision, in this case the nodal points. A time difference between the first and the second arrival instant is then calculated on the basis of the calculated arrival instants. It can then be determined, on the basis of the calculated time difference, whether a travel path collision exists. Additionally or alternatively, generation of a signal may also be initiated, to warn the driver in dependence on the calculated time difference.

As represented in FIG. 2C, there is a time difference of approximately 2 seconds for the arrival instants of the two vehicles 110-1 and 110-2 at the first point of potential collision. This time difference may be compared with a threshold value. For example, the threshold value may be 5 seconds. In order to avoid possible "false" hazard situations, the threshold value may also be a shorter time, for example 3 seconds or only 2 seconds. The threshold value may also be selected in dependence on the link attributes or nodal point attributes. Thus, for example, priority directions or the turning-off of a travel path, as well as the continuity of the travel path in the same direction, can also be taken into account. From the example of FIG. 2C, it may be assumed that, if the vehicle 110-1 has priority, the vehicle 110-1 does not reduce speed, whereas the turning-off vehicle 110-2 reduces its speed at the nodal point. The vehicle 110-2 must additionally turn off, i.e. merge into the other traffic, which is more time-intensive than in the case of the continuing vehicle 110-1. A greater threshold value can therefore be set for the vehicle 110-2 than for the vehicle 110-1.

In each case, if the time difference is less than the threshold value, a signal is generated and transmitted to the respective vehicle. On the basis of this signal, the apparatuses 110-1 and 110-2 may output a warning to the respective driver. For example, the vehicle 110-1 (assuming a priority of this vehicle) may output only a minor (low-sound) indication to the driver, indicating to the latter that a vehicle will move in from the left. In the case of the vehicle 110-2 (assuming that this vehicle must take account of the priority), a corresponding warning message is output to the driver, by visual display or acoustically, that there is a vehicle approaching the nodal point from the right, to which priority must be ceded. The same applies, for example, for right-before-left rules. At least one driver can therefore be warned beforehand that there is also another vehicle 110 present, at a similar instant or at the same instant, on the most probable path of the vehicle 110.

This system may additionally be supported in that the infrastructure of the traffic network can likewise transmit data to the vehicles. For example, road signs or traffic lights or similar installations may transmit data about the current traffic situation to surrounding vehicles. For example, if there is a traffic light installation at the nodal point represented as a point of potential collision in FIG. 2C, then corresponding traffic-light switching operations may be transmitted to the vehicles 110, where they are used, with other information, for generating a corresponding warning signal. It is also conceivable that, in the case of a failed traffic light installation, the corresponding priority direction is transmitted to the vehicles. In the case of a traffic light installation that has been switched off, therefore, the vehicles 110-1 and 110-2 may output corresponding collision warnings, in consideration of the corresponding priority situation, to the respective driver. Clearly, the infrastructure installations may also send these data to the server system 130 for further processing there.

Figure 4:
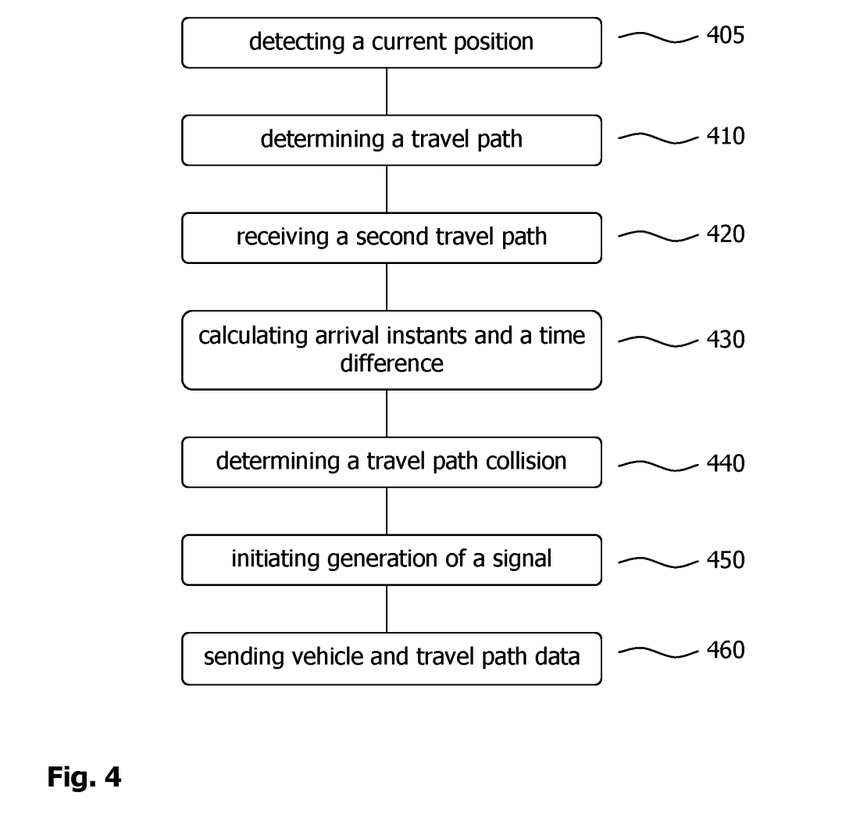
FIG. 4 a sequence diagram of a further method according to a further embodiment of the present disclosure.

A similar method for avoiding collisions between vehicles may be executed on an apparatus (a device) 110-N of a first vehicle. For example, the data processing unit 170 may execute a method, as represented in FIG. 4. In this case, a server system 130 may be included for receiving data. Alternatively, however, the apparatuses 110 of the vehicles involved may communicate directly with one another, such that the data processing unit 170 of the vehicle 110-N effects the evaluation of the travel paths.

As represented in FIG. 4, the method optionally commences with the detection of a current position (step 405). The current position may be effected by means of a satellite-supported system or determined on the basis of a map and further items of vehicle information (speed, steering lock, cardinal point, etc.).

In any case, a travel path of the first vehicle is determined. This may be effected on the basis of the detected current position. The travel path is a most probable path MPP1 of the first vehicle 110-1. The determination of the most probable path MPP1 may additionally be effected on the basis of map data. In this case, the map data may represent traffic ways of at least one traffic network region, in which the current position of the first vehicle 110-1 is located. The map data may be provided by a navigation system (not shown). Alternatively, the map data may also be provided by the data processing unit 170.

In a further step 420, data representing a travel path of a second vehicle 110-2 are received. This travel path, also, is a most probable path MPP2, of the second vehicle 110-2. According to a further method step 440, it is determined whether the travel path MPP1 of the first vehicle 110-1 collides with the travel path MPP2 of the second vehicle 110-2. Upon determination of such a travel path collision, generation of a signal may be initiated, in a step 450, to warn a driver of the first vehicle 110-1 of a possible collision with the second vehicle 110-2.

The details described above in relation to the method represented in FIG. 3 clearly also apply to the method according to FIG. 4, which is executed on an apparatus of the first vehicle 110-1. Thus, in this method also, an optional step 430 may be performed, to calculate arrival instants and a time difference of at least two vehicles at a point of potential collision within the traffic network. The method may additionally include the receiving of data that represent a time specification of when the second vehicle occupied a particular position. These data may be received together with, or separately from, the data of the second travel path MPP2. In the latter case, the data must also include at least a vehicle identification of the second vehicle 110-2, such that the data can be combined with the received travel path data. On the basis of this received time specification, the data processing device 170 may effect a second arrival instant of the second vehicle 110-2 at the point of potential collision.

Alternatively or additionally, data representing a hazard instant may be received from the second vehicle 110-2. The hazard instant represents an instant at which the second vehicle 110-2 is present at the point of potential collision. In this case, the data processing unit 170 may calculate the second arrival instant in dependence on the hazard instant. This alternative is particularly advantageous if, in addition to the MPP, possible points of potential collision along the MPP have also already been determined on each vehicle 110. In this case, it is useful to transmit, not only the data of the traffic network that represent the MPP, but also at the same time the hazard instants at which the second vehicle 110-2 is present at the point(s) of potential collision. The instant at which the second vehicle 110-2 is present at the corresponding points therefore need not be calculated by the data processing unit 170 of the first vehicle 110-2.

Finally, data is also sent from the first vehicle 110-1, in step 460. These data may represent the current position of the first vehicle 110-1, the most probable path MPP1 of the first vehicle 110-1, map data of a map region, in which the current position of the first vehicle 110-1 is located, a point of potential collision within a traffic network, and/or a hazard instant, at which the first vehicle 110-1 is present at the point of potential collision. The data may be sent to a central server system 130. Alternatively or additionally, the data may be transmitted to the network 120 without specification of a specific recipient, and thus received by further vehicles 110-2 to 110-N and also by the server system 130.

The two methods described in relation to FIGS. 3 and 4 and FIGS. 2A to 2C relate to collision avoidance or a collision warning at an intersection. Clearly, the methods may also identify and take account of other points of potential collision such as, for example, the overtaking lanes, approach/departure lanes, etc. mentioned above.

The present disclosure offers the advantage that navigation systems and/or driver assistance systems for vehicles can be improved. Thus, intersection assistance, overtaking assistance or, also, improved lane assistance may be realized.

Known systems use the MPP only for local driver assistance tasks of their own vehicle. The exchange of the most probable path (MPP) between vehicles makes it possible to improve collision avoidance and thereby increase road traffic safety. Moreover, the MPP can also be transmitted in a very simple manner. The data defining the MPP are limited to a few bytes, since only a small amount of traffic network data, in particular only identifications (IDs), need be transmitted. This allows the use of switching and computing components that have a very low level of complexity, with the result that the processing, calculation and transmission speeds can be greatly increased. For example, simple application-specific integrated circuits (ASIC) may be used, or small software-based controllers may also be integrated into existing processor systems, in order to implement the present disclosure. The methods and apparatuses of the present disclosure can therefore not only be easily integrated retroactively into existing systems (navigation systems, driver assistance systems, vehicle control systems, etc.), but the adaptation of existing systems to the methods and/or apparatuses of the present disclosure also requires very little computing and data transmission resources, such that the burden on the existing systems is extremely small.

The present disclosure can be realized in a particularly simple manner if the vehicles use the same underlying map material. Then, advantageously, it suffices to transmit only the unique identifications (IDs) of the links and nodal points along the respective MPP. On the basis of the same database (the same map material), the driver assistance systems and/or navigation systems of the other vehicles can immediately compare the received MPP with their own and execute the methods described above.

Even if the vehicles use differing map data, however, the present disclosure offers many advantages. All that is required is an additional map matching. For this purpose, as an alternative or in addition to the transmission of the unique identifications (IDs) of the links and nodal points, it is useful for generally applicable geometric information relating to the links and/or nodal points, such as, for example, global coordinates, to be transmitted. Any receiving device may put this geometric information onto its own map material, and determine the most suitable links and nodal points. Since, according to the present disclosure, only an MPP or a portion thereof is transmitted, it is also necessary to send only a small amount of data for the purpose of map matching. As an alternative or in addition to geometric information, particular road attributes, such as road class or road name, may also be transmitted. For safety in this case, coordinates of important nodal points such as, for example, the first and/or last nodal point of the MPP, and optionally an intermediate nodal point, may also be transmitted. The receiving devices are consequently able to map the received MPP into their own map material.

A further advantage is offered here by the solution comprising a server system. Various map systems (map data) may be stored in the latter. In addition, the server system may be equipped with the corresponding processor capacity to perform map matching between the various map systems. For example, the server system may set up a data transmission session with each vehicle, in which each vehicle communicates the respectively underlying map material to the server system. On the basis of these data, the server system may send to each vehicle the MPPs of the other vehicles, in geometric form (e.g. WGS64 coordinates), or in the form explained in the method, i.e. with unique identifications (IDs) of the links and nodal points of the map data used in the respective vehicle.

The invention claimed is:

1. A method for avoiding collisions between vehicles, the method comprising:

receiving data that represent a first travel path of a vehicle, the first travel path being a most probable path of the first vehicle;

receiving data that represent at least one second travel path of at least one further vehicle, the second travel path being a most probable path of one of the further vehicles;

determining whether the first travel path collides with the second travel path by detecting whether the first vehicle collides another vehicle within a predetermined threshold time value, the determining of a travel path collision comprising determining a point of potential collision within a traffic network;

upon determination of a travel path collision, initiating generation of a signal to warn a driver of at least one of the vehicles of a possible collision with another vehicle;

calculating a first arrival instant, at which the vehicle belonging to the first travel path arrives at the point of potential collision, in dependence on the first travel path;

calculating a second arrival instant, at which the vehicle belonging to the second travel path arrives at the point of potential collision, in dependence on the second travel path; and calculating a difference between the first and the second arrival instant, at least one of the determining of a travel path collision and the initiating of generation of a signal being effected in dependence on the calculated time difference.

2. The method according to claim 1, the receiving of data comprising receiving data that identify at least one of one or more nodal points of a traffic network and one or more links between nodal points of the traffic network and one or more shape points of the respective travel path.

3. The method according to claim 1, the receiving of data comprising receiving data that represent a current position of at least one of the vehicles belonging to the travel paths.

4. The method according to claim 1, the determining of a point of potential collision comprising checking whether the first and the second travel path have a common element in the traffic network.

5. The method according to claim 1, the initiating of generation of a signal comprising sending, to the at least one of the vehicles, data that identify a possible collision with another vehicle.

6. A server system, comprising:

data transmission unit, which is designed to receive data from at least one vehicle and to send data to at least one vehicle; and processor system, which is designed to control the data transmission unit and to execute receiving data that represent at least one second travel path of at least one further vehicle, the second travel path being a most probable path of one of the further vehicles;

determining whether the first travel path collides with the second travel path by detecting whether the first vehicle collides another vehicle within a predetermined threshold time value, the determining of a travel path collision comprising determining a point of potential collision within a traffic network;

upon determination of a travel path collision, initiating generation of a signal to warn a driver of at least one of the vehicles of a possible collision with another vehicle;

calculating a first arrival instant, at which the vehicle belonging to the first travel path arrives at the point of potential collision, in dependence on the first travel path;

calculating a second arrival instant, at which the vehicle belonging to the second travel path arrives at the point of potential collision, in dependence on the second travel path; and calculating a difference between the first and the second arrival instant, at least one of the determining of a travel path collision and the initiating of generation of a signal being effected in dependence on the calculated time difference.

7. A method for avoiding collisions between vehicles, the method being executed by a device in a first vehicle and comprising:

detecting a current position of the first vehicle;

determining a travel path of the first vehicle on the basis of the detected current position, the travel path being a most probable path of the first vehicle;

receiving data that represent a travel path of a second vehicle, the travel path being a most probable path of the second vehicle;

determining whether the travel path of the first vehicle collides with the travel path of the second vehicle by detecting whether the first vehicle collides another vehicle within a predetermined threshold time value, the determining of a travel path collision comprising determining a point of potential collision within a traffic network along the travel path of the first vehicle;

upon determination of such a travel path collision, initiating generation of a signal to warn a driver of the first vehicle of a possible collision with the second vehicle;

calculating a first arrival instant, at which the first vehicle arrives at the point of potential collision, in dependence on the associated travel path;

calculating a second arrival instant, at which the second vehicle arrives at the point of potential collision, in dependence on the associated travel path; and calculating a time difference between the first and the second arrival instant, at least one of the determining of a travel path collision and the initiating of generation of a signal being effected in dependence on the calculated time difference.

8. The method according to claim 7, the receiving of data comprising receiving data that identify at least one of one or more nodal points of a traffic network and one or more links between nodal points of the traffic network and one or more shape points of the travel path of the second vehicle.

9. The method according to claim 7, the determining of the most probable path additionally being effected on the basis of map data, the map data representing traffic ways of at least one traffic network region in which the current position of the first vehicle is located.

10. The method according to claim 7, the determining of a point of potential collision comprising checking whether the travel paths of the first and the second vehicle have a common element in the traffic network.

11. The method according to claim 7, the receiving of data comprising receiving data that identify a point of potential collision within a traffic network along the travel path of the second vehicle.

12. The method according to claim 7, further comprising at least one of:
receiving data that represent a time specification, when the second vehicle occupied a particular position, the calculating of a second arrival point being effected in dependence on the time specification of the second vehicle; and
receiving data that represent a hazard instant, at which the second vehicle is present at the point of potential collision, the calculating of a second arrival instant being effected in dependence of the hazard instant.

13. The method according to claim 7, further comprising at least one of:
the calculating of the first arrival instant being effected in dependence on the current position of the first vehicle, and
the calculating of a second arrival instant being effected in dependence on a start point of the travel path of the second vehicle; and
receiving data that identify a position of the second vehicle, the calculating of a second arrival instant being effected in dependence on the position of the second vehicle.

14. The method according to claim 7, the data being received from a central server system.

15. The method according to claim 7, further comprising:
sending, to a central server system, data that represent at least one of the current position of the first vehicle, and the most probable path of the first vehicle, and map data of a map region in which the current position of the first vehicle is located, and a point of potential collision within a traffic network, and a hazard instant, at which the first vehicle is present at the point of potential collision.

16. An apparatus for avoiding collisions between vehicles, the apparatus being disposed in a first vehicle and comprising;
a position detection unit, which is designed to detect a current position of the first vehicle;
a path determination unit, which is designed to determine a travel path of the first vehicle on the basis of the detected current position, the travel path being the most probable path of the first vehicle;
a data transmission unit, which is designed to receive data that represent a travel path of a second vehicle, the travel path being a most probable path of the second vehicle; and
a data processing unit, which is designed to:
determine whether the travel path of the first vehicle collides with the travel path of the second vehicle by detecting whether the first vehicle collides another vehicle within a predetermined threshold time value;
upon determination of a travel path collision, to initiate generation of a signal to warn a driver of the first vehicle of a possible collision with the second vehicle;
determine a point of potential collision within a traffic network along the travel path of the first vehicle;
calculate a first arrival instant, at which the first vehicle arrives at the point of potential collision, in dependence on the associated travel path;
calculate a second arrival instant, at which the second vehicle arrives at the point of potential collision, in dependence on the associated travel path; and calculate a time difference between the first and the second arrival instant,
at least one of the determining of a travel path collision and the initiating of generation of a signal being effected in dependence on the calculated time difference.

17. The apparatus according to claim 16, the path determination unit further being designed to determine the travel path of the first vehicle on the basis of map data, the map data representing traffic ways of at least one traffic network region in which the current position of the first vehicle is located.

18. The apparatus according to claim 16, the data transmission unit further being designed to receive data that indicate a point of potential collision within a traffic network along the travel path of the second vehicle.

19. The apparatus according to claim 16, the data transmission unit further being designed to receive data that represent at least one of a time specification, when the second vehicle occupied a particular position, and data that represent a hazard instant, at which the second vehicle is present at the point of potential collision,
the data processing unit further being designed to calculate the second arrival instant in dependence on at least one of the time specification of the second vehicle and the hazard instant.

20. The apparatus according to claim 16, the data processing unit further being designed to at least one of calculate the first arrival instant in dependence on the current position of the first vehicle, and calculate the second arrival instant in dependence on a start point of the travel path of the second vehicle.

21. The apparatus according to claim 16, the data transmission unit further being designed to receive data that indicate a position of the second vehicle, and the data processing unit further being designed to calculate the second arrival instant in dependence on the position of the second vehicle.

22. The apparatus according to claim 16, the data transmission unit further being designed to receive and send data from and to at least one of a central server system and a data transmission unit of another vehicle.

23. The apparatus according to claim 16, the apparatus being at least one of part of a vehicle navigation system and part of a driver assistance system, and a portable device.

24. A non-transitory storage medium, comprising portions of program code that, when executed by a processor system, cause the processor system to execute
receiving data that represent a first travel path of a vehicle, the first travel path being a most probable path of the first vehicle;
receiving data that represent at least one second travel path of at least one further vehicle, the second travel path being a most probable path of one of the further vehicles;
determining whether the first travel path collides with the second travel path by detecting whether the first vehicle collides another vehicle within a predetermined threshold time value, the determining of a travel path collision comprising determining a point of potential collision within a traffic network;
upon determination of a travel path collision, initiating generation of a signal to warn a driver of at least one of the vehicles of a possible collision with another vehicle;

calculating a first arrival instant, at which the vehicle belonging to the first travel path arrives at the point of potential collision, in dependence on the first travel path;

calculating a second arrival instant, at which the vehicle belonging to the second travel path arrives at the point of potential collision, in dependence on the second travel path; and calculating a difference between the first and the second arrival instant, at least one of the determining of a travel path collision and the initiating of generation of a signal being effected in dependence on the calculated time difference.

25. A non-transitory storage medium, comprising portions of program code that, when executed by a processor system, cause the processor system to execute detecting a current position of the first vehicle;

determining a travel path of the first vehicle on the basis of the detected current position, the travel path being a most probable path of the first vehicle;

receiving data that represent a travel path of a second vehicle, the travel path being a most probable path of the second vehicle;

determining whether the travel path of the first vehicle collides with the travel path of the second vehicle by detecting whether the first vehicle collides another vehicle within a predetermined threshold time value, the determining of a travel path collision comprising determining a point of potential collision within a traffic network along the travel path of the first vehicle;

upon determination of such a travel path collision, initiating generation of a signal to warn a driver of the first vehicle of a possible collision with the second vehicle;

calculating a first arrival instant, at which the first vehicle arrives at the point of potential collision, in dependence on the associated travel path;

calculating a second arrival instant, at which the second vehicle arrives at the point of potential collision, in dependence on the associated travel path; and calculating a time difference between the first and the second arrival instant, at least one of the determining of a travel path collision and the initiating of generation of a signal being effected in dependence on the calculated time difference.

* * * * *